H. DELANO.

Carriage Hubs and Axles.

No. 14. Reissued Sept. 25, 1839.

THE NORRIS PETERS CO., PHOTO-LITHO., WASHINGTON, D. C.

UNITED STATES PATENT OFFICE.

HOWARD DELANO, OF SKANEATELES, NEW YORK.

IMPROVEMENT IN THE MODE OF CONSTRUCTING HUBS FOR THE WHEELS OF CARRIAGES, &c.

Specification forming part of Letters Patent No. 448, dated October 28, 1837; Reissue No. 14, dated September 25, 1839.

*To all whom it may concern:*

Be it known that I, HOWARD DELANO, of Skaneateles, and county of Onondaga, and State of New York, did, on the 28th day of October, 1837, obtain Letters Patent of the United States for an Improvement in the Mode of Constructing Hubs for the Wheels of Carriages; but, believing that the specification or description attached to said Letters Patent do not, from inadvertence and mistake, fulfill in all points the requirements of the law regulating the granting of patents, the following is to be substituted therefor, being, as I verily believe, a full, clear, and exact description of my said invention, and of the several modes in which I had, at the time of the date of said patent, contemplated the application of the principle upon which I construct the said hubs, the axles received within them, and the appendages thereto.

I make the hubs of cast-iron or other metal, preferring to cast them solid and to bore them out to receive the axle, although they may be cored and rimmed out, the front end being left solid. The size of the respective parts may of course be varied to suit the carriage with which my hub and axle are used. That which I am about to describe may be considered as of a medium size, the accompanying drawing showing it of the proper dimensions for an ordinary one horse carriage. That part of the hub which is to receive the spokes is cast with the mortises necessary for that purpose, and does not differ from such cast-iron hubs as have been heretofore made.

Figure 1:
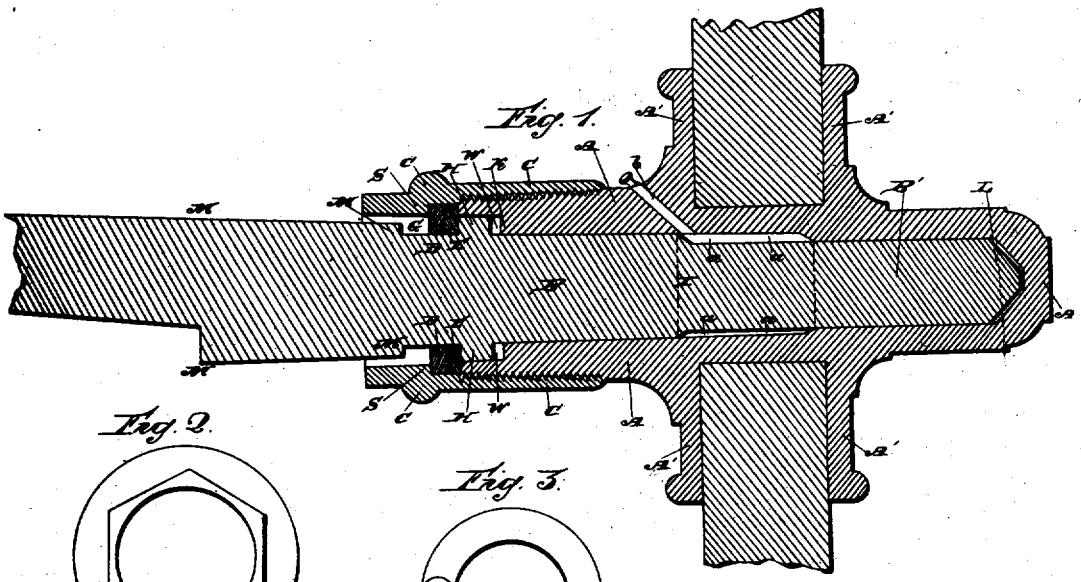

Figure 1 in the accompanying drawings shows a section of the hub and a part of the axle along the centers thereof.

A A is the cast-iron hub or nave, the part A′ A′ being the cheeks of the mortises to receive the spokes. B B′ is the axle adapted to the bore of the hub in a manner to be now described. From the points I to K the axle is about an inch and a quarter in diameter, and from the point I to the end L about one inch in diameter. The hub at its rear end, or from the point K to J, is bored out of the proper size for the part B of the axle to run within it, and from J to the end L it is bored so as to adapt it to the size of the axle at B′. By this construction an oil-chamber is formed around the axle, there being a space, *a a*, resulting from the diminution in the size of the axle, commencing at the I point and extending, as shown in the drawings, immediately under the spokes of the wheel. Into this space a hole, *b*, is drilled in any convenient situation for the purpose of supplying oil, said hole being furnished with a screw-stopper, or one of any other suitable kind.

Figure 2:
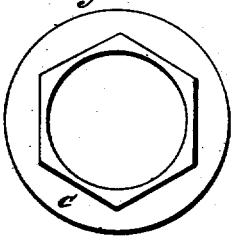
Figure 3:
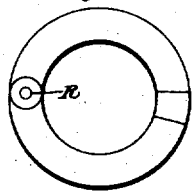
Figure 4:
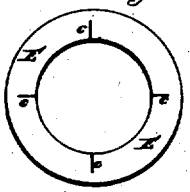

The following is the manner in which I connect the hub to the arm B B′ of the axle. Upon the axle I form a projecting fillet or band, as shown at H H, which is received into a corresponding enlargement bored out at the rear end of the hub to receive it. Against the rear shoulder of this band or fillet a washer of leather and another of metal are borne up by means of a screw-collar in the following manner: C C is a screw-collar, usually made of brass, and made to screw onto the inner end of the hub, as shown in the drawings, right and left handed screws being employed to adapt them to opposite wheels and prevent the danger of their becoming unscrewed by the forward motion of the carriage. Fig. 2 shows the back end of this screw-collar, with the necessary provision for the application of a screw-wrench. D D is a divided collet or washer, of metal, against which the shoulder S S of the screw-collar presses. This may consist of a ring divided into two equal parts, or the two parts may be hinged together, as shown at R, Fig. 3, as in either case it may be readily placed in the situation which it is intended to occupy. Within this I place a leather washer, E E, which may be cut through and slipped into its place. A better mode, however, is to divide it partially by cuts C C, Fig. 4, from its inner edge, which will admit of its being sprung over into its place without actually dividing it. The part M M of the axle is to a sufficient distance in the rear of the screw-collar *c* made round, and of such size as to admit of the passing of the collar over it when it is to be retracted. It is sometimes desired to give some play endwise to the hub upon the axle, many persons believing that there is an advantage in this. All that will be necessary in this case will be to give a greater depth to the recess for the fillet or band H H than otherwise, as shown at W W, the arm of the axle being in this case sufficiently shortened to admit of such play. To prevent the effect of the blow of the two metallic shoulders, a collar of leather may be placed in the recess W.

Figure 7:
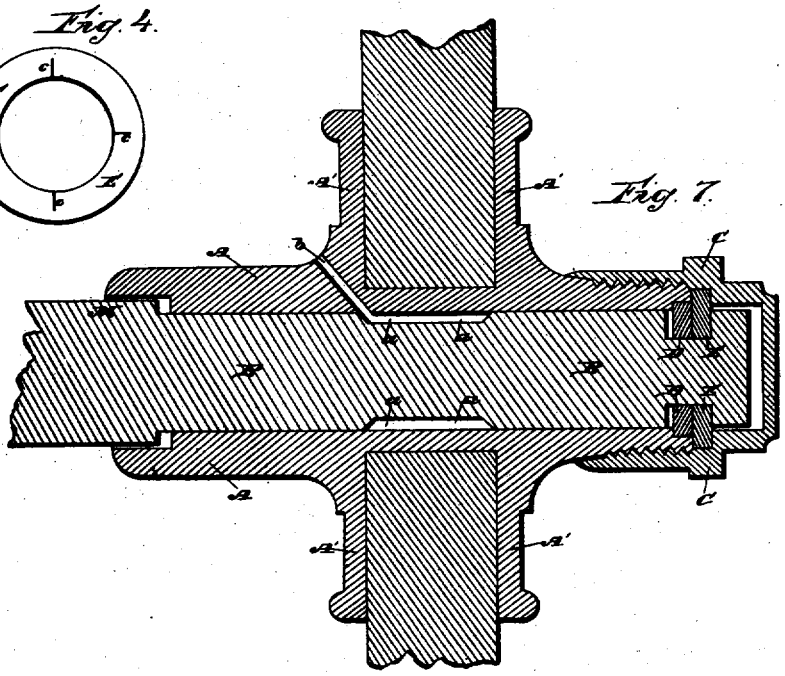

Another mode in which I have contemplated carrying the same principle into effect is by inserting the metallic and leather washers into recesses formed in the bore of the hub and in the arm of the axle near the fore ends thereof, in which case the fore end of the hub will constitute a screw-cap and perform the same office with that of the screw-collar under the arrangements before described. This modification of my plan is shown in Fig. 7, where *c c* is the fore end of the hub converted into a screw-cap, right and left handed screws being employed as adapted to the opposite wheels. D D is the metal, and E E the leather, washer. The mode of inserting them will be obvious, from what has been already said and from inspecting the drawings, and could not be rendered more clear by any further description.

What I claim as my invention, and desire to secure by Letters Patent, is—

1. The within-described mode of attaching metallic hubs and holding them onto the arms of the axles by the insertion of divided washers in a groove on the arms of the axles, and a screw-band or screw-cap operating on the washers in the manner herein set forth.

2. The manner of joining the oil-chamber by diminishing the size of the axle from the point I, Fig. 1, and continuing the larger bore of the hub to the point J in the first modification of my plan, which may also be applied to the last modification.

HOWARD DELANO.

Witnesses:
LINTON THORN,
C. H. WILTBERGER.